Figure 1:
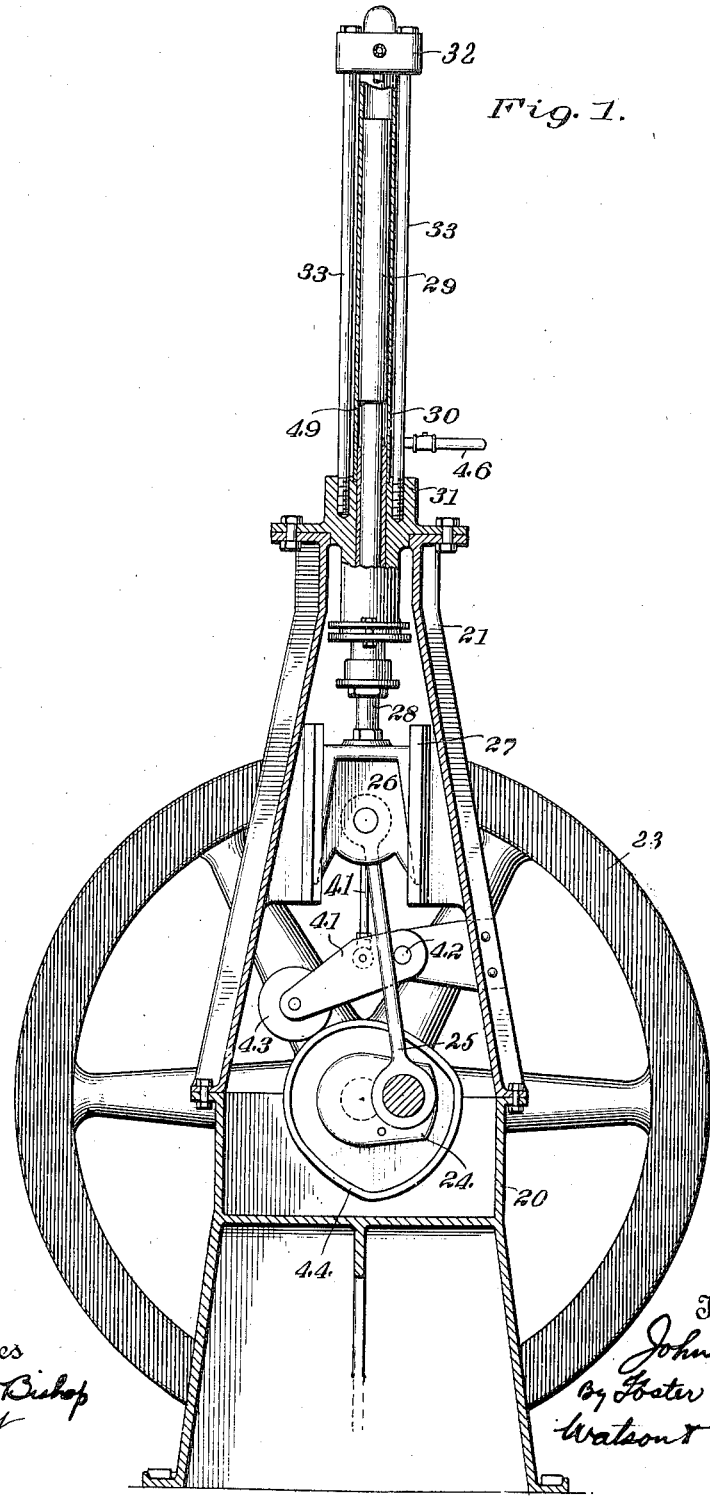

J. PATTEN.
LIQUID EXPANDING AND CONTRACTING POWER GENERATING SYSTEM.
APPLICATION FILED AUG. 31, 1910.

1,032,236.

Patented July 9, 1912.

10 SHEETS—SHEET 1.

J. PATTEN.
LIQUID EXPANDING AND CONTRACTING POWER GENERATING SYSTEM.
APPLICATION FILED AUG. 31, 1910.

1,032,236.

Patented July 9, 1912.

10 SHEETS—SHEET 4.

J. PATTEN.
LIQUID EXPANDING AND CONTRACTING POWER GENERATING SYSTEM.
APPLICATION FILED AUG. 31, 1910.

1,032,236.

Patented July 9, 1912.

10 SHEETS—SHEET 7.

J. PATTEN.
LIQUID EXPANDING AND CONTRACTING POWER GENERATING SYSTEM.
APPLICATION FILED AUG. 31, 1910.

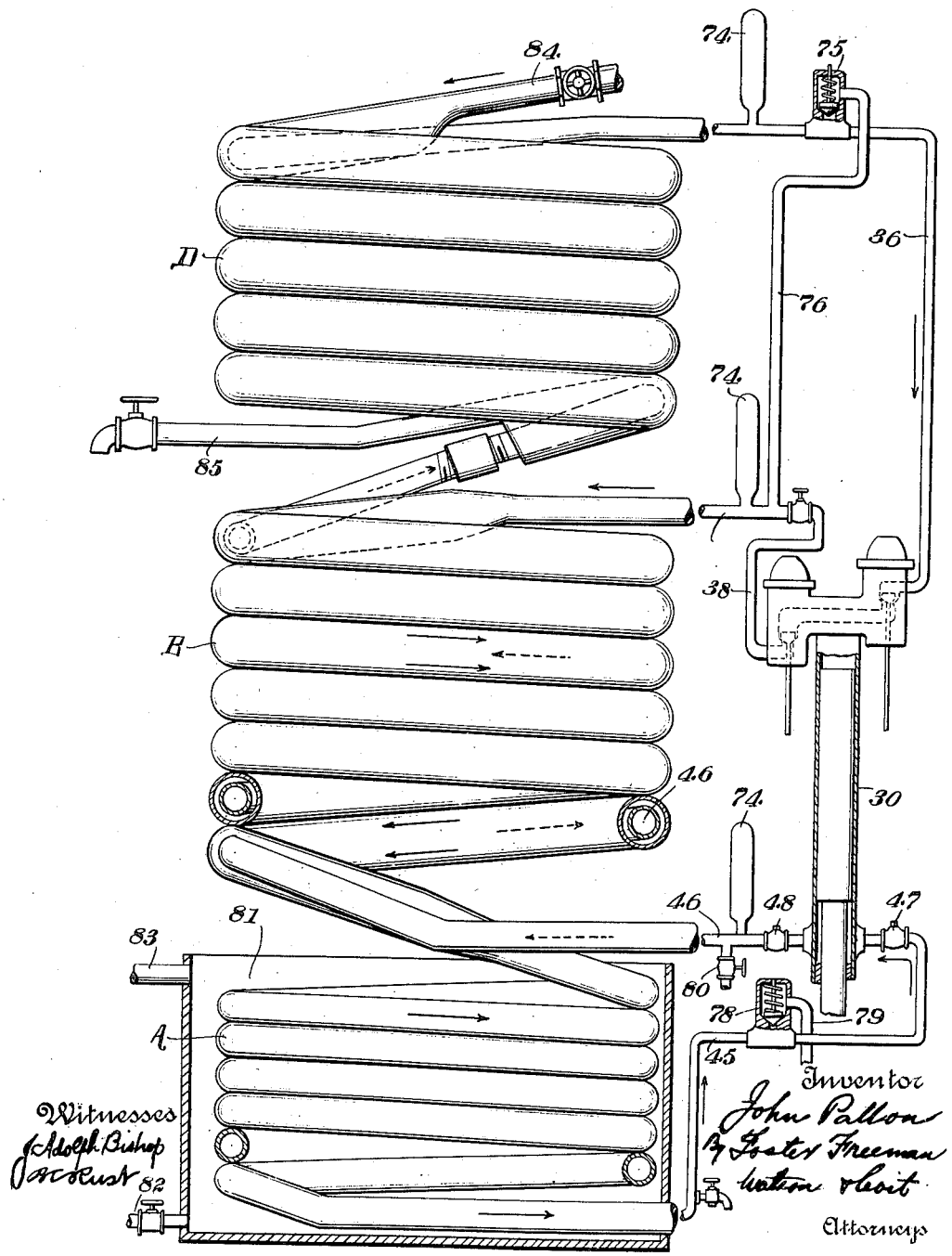

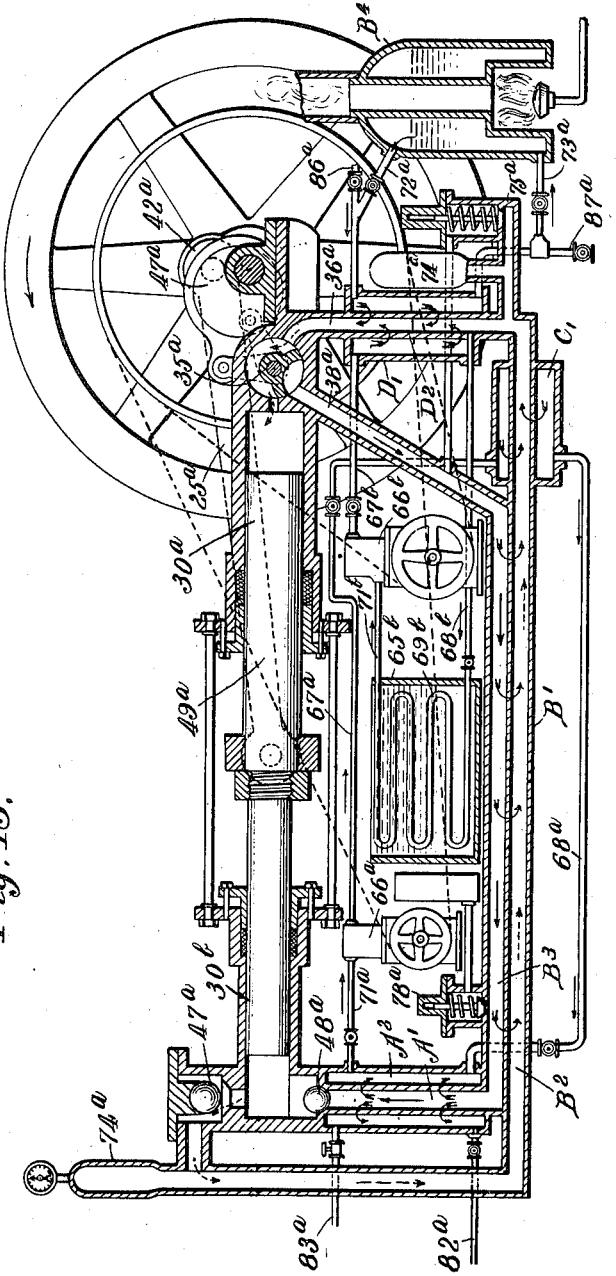

UNITED STATES PATENT OFFICE.

JOHN PATTEN, OF BALTIMORE, MARYLAND, ASSIGNOR OF ONE-HALF TO ERNEST B. MILLER, OF BALTIMORE, MARYLAND.

LIQUID EXPANDING AND CONTRACTING POWER-GENERATING SYSTEM.

1,032,236.   Specification of Letters Patent.   Patented July 9, 1912.

Application filed August 31, 1910. Serial No. 579,841.

*To all whom it may concern:*

Be it known that I, JOHN PATTEN, a citizen of the United States, and resident of Baltimore, Maryland, have invented certain new and useful Improvements in Liquid Expanding and Contracting Power-Generating Systems, of which the following is a specification.

This invention is a power generating apparatus, comprising a liquid pressure motor and means for continuously circulating a liquid under pressure through the motor, the liquid being alternately heated and expanded under high pressure and cooled and contracted under lower pressure.

In the practical operation of my invention a highly expansible liquid, such as carbon dioxid, sulfur dioxid, or carbon tetrachlorid is circulated through a motor. The exhaust liquid from the motor passes through a heat exchanger in which it is partially cooled, imparting its heat to the return liquid going to the motor. The exhaust liquid is then preferably further cooled by passing it through coils in a tank supplied with naturally cooled water or with water, brine or other fluid artificially cooled. The cooled exhaust liquid, greatly reduced in bulk by contraction, is then pumped into the return system of piping in which it is reheated under high pressure by passing it through the heat exchanger. It is then raised to a still higher temperature by passing it through coils exposed to exhaust or live steam, or some other source of heat. When heated to the highest temperature desirable the liquid will have greatly increased in bulk by expansion, it being possible to increase the bulk of certain liquids one hundred per cent. more or less in this manner, without raising them to such high temperatures as would interfere with their proper action in the motor. I am thus enabled to utilize heat from exhaust steam or other sources, which is ordinarily wasted, to produce power. It will be understood that my motive liquid is used under very high pressures.

This invention is a thermo-hydraulic cycle power generating method for economically converting heat into mechanical work by heating under high pressure a liquid having a high coefficient of expansion by a countercurrent of the same liquid under less pressure in a heat exchanger, further heating the liquid by heat from an extraneous source, conducting the hot expanded liquid under high pressure into an engine which it operates, then discharging the liquid under lower pressure from the engine to the heat exchanger where it imparts a portion of its heat to the countercurrent stream of the high pressure liquid, then passing it through a cooler where it is further cooled by imparting a portion of its heat to colder bodies with which it is brought in contact, then conducting the cooled contracted low pressure liquid into a pump which forces it out under the high pressure to the heat exchanger by power furnished by the engine, thus completing a cycle of operations. The engine operates the pump and provides a surplus power which can be used for other purposes, this surplus power being due to the expansion of the liquid by heat. The displacement of the engine will exceed that of the pump by from twenty five to two hundred per cent. and over, according to the range of temperature and liquid used.

The invention will be described more in detail in connection with the accompanying drawings, in which,—

Figure 2:
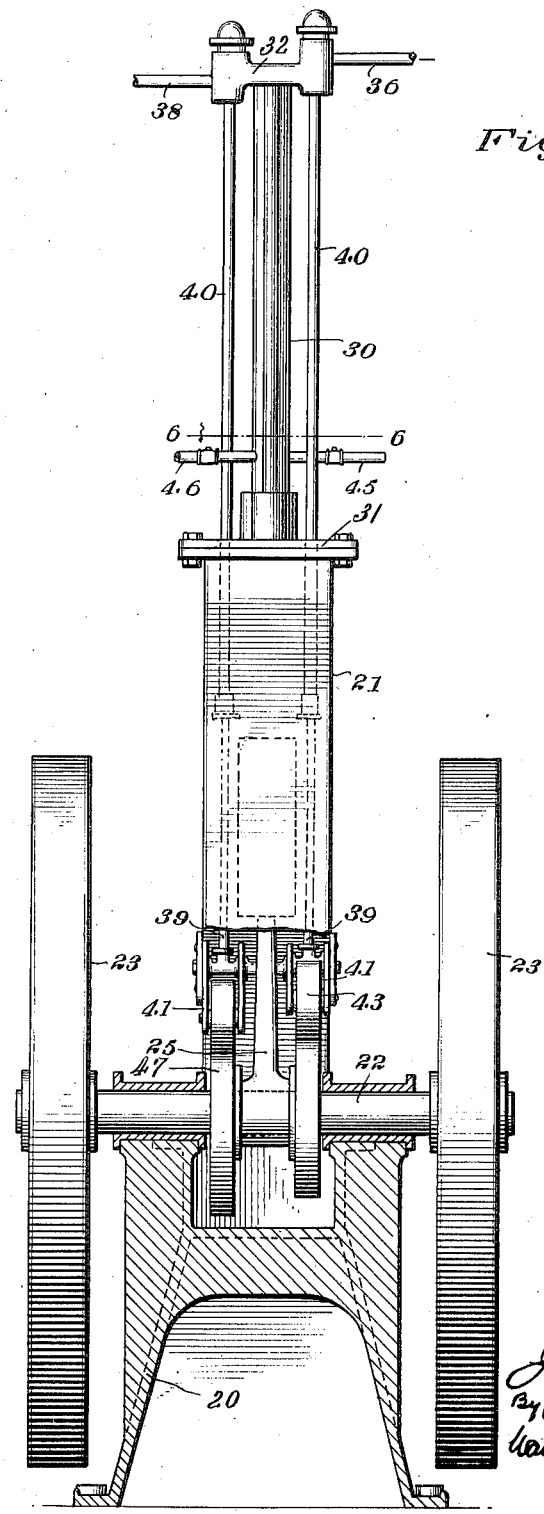
Figure 3:
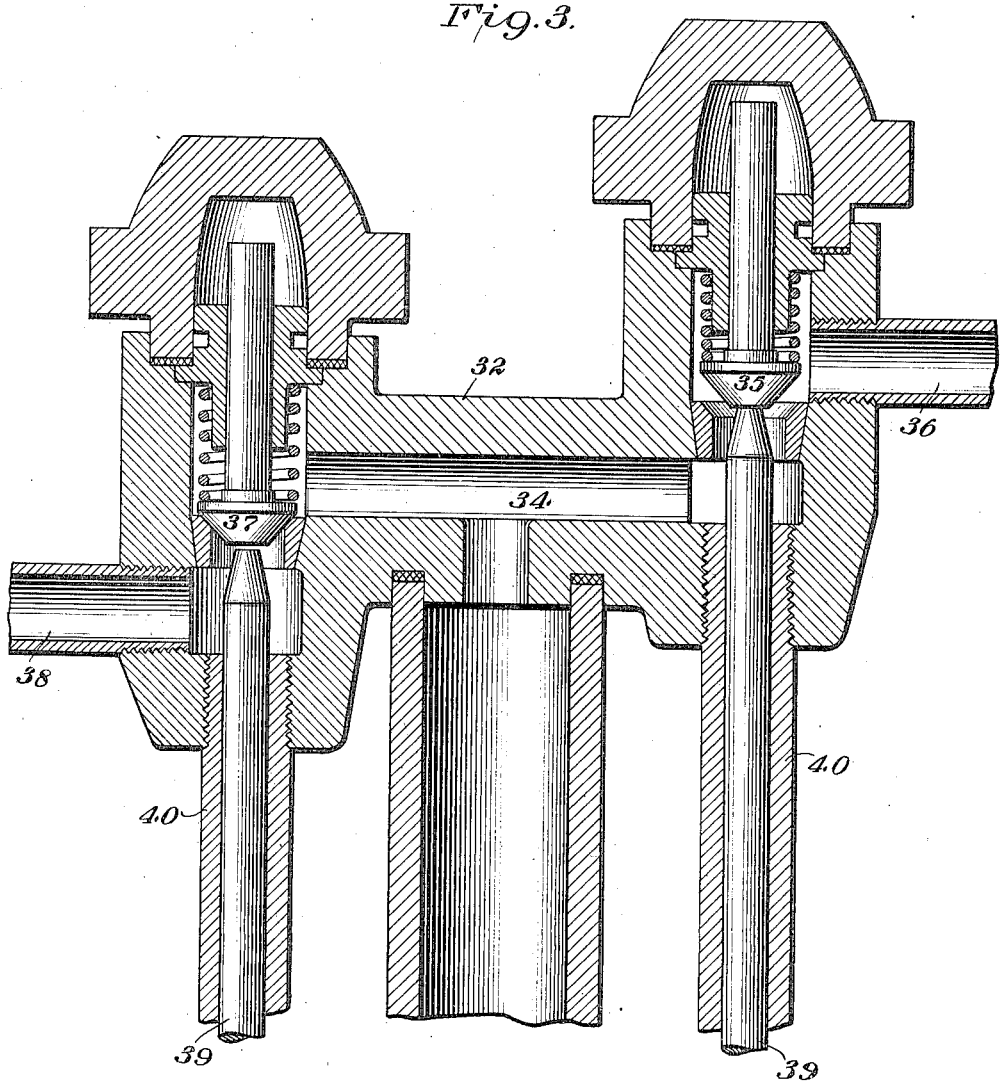
Figure 4:
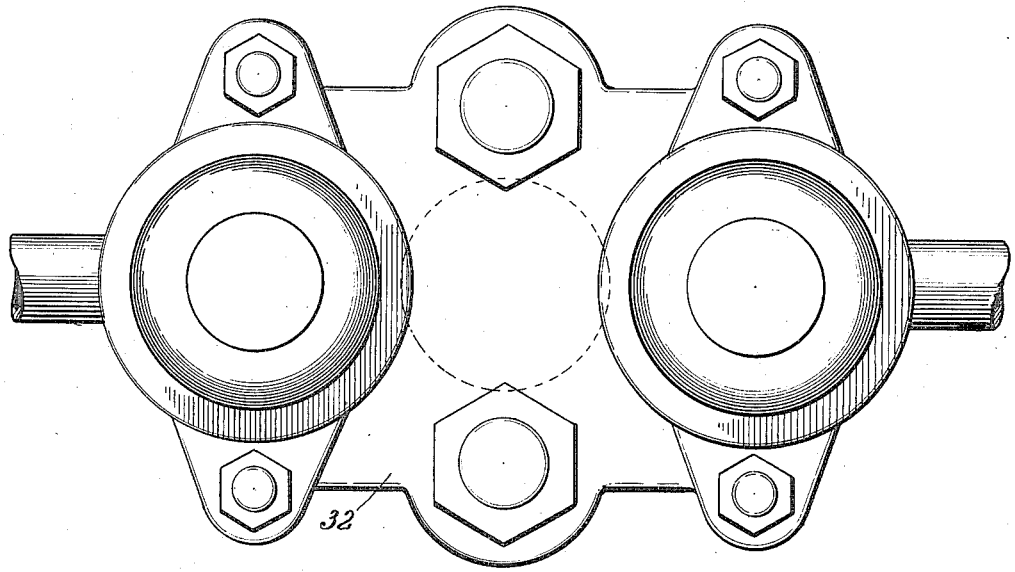
Figure 5:
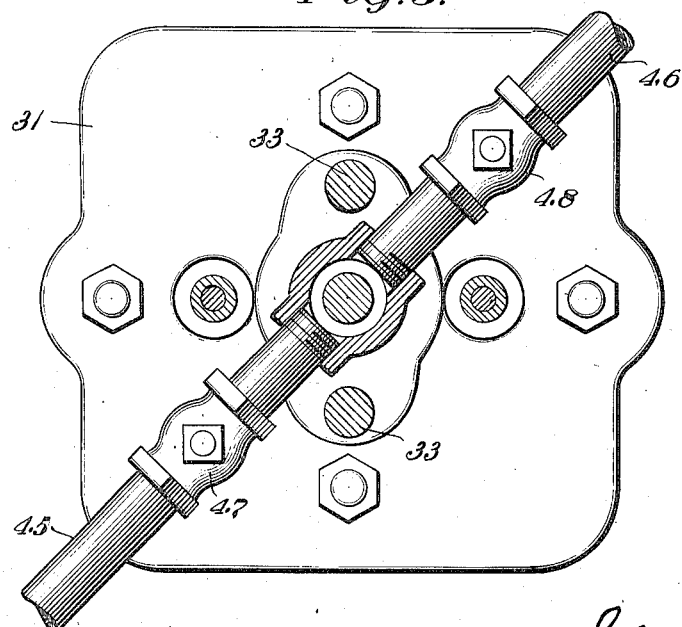
Figure 6:
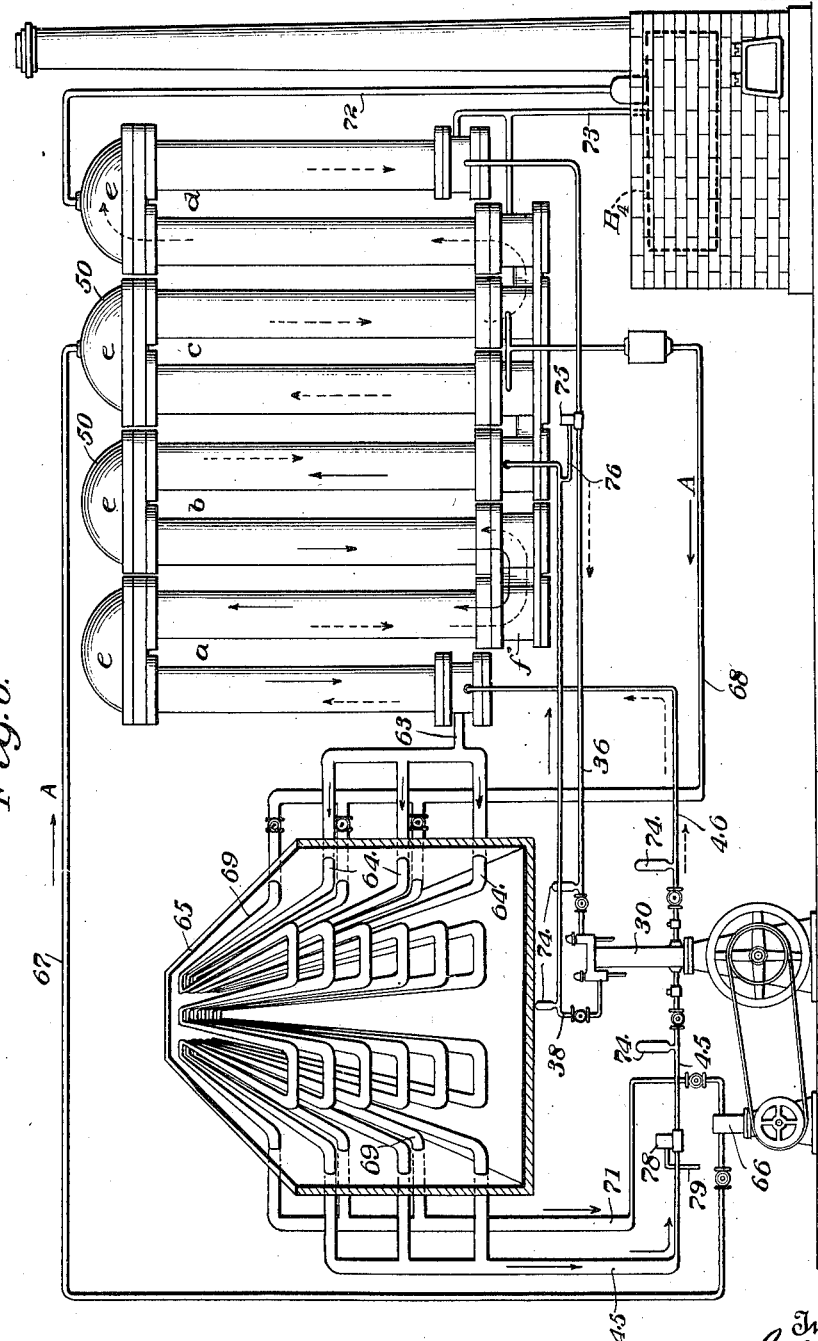
Figure 7:
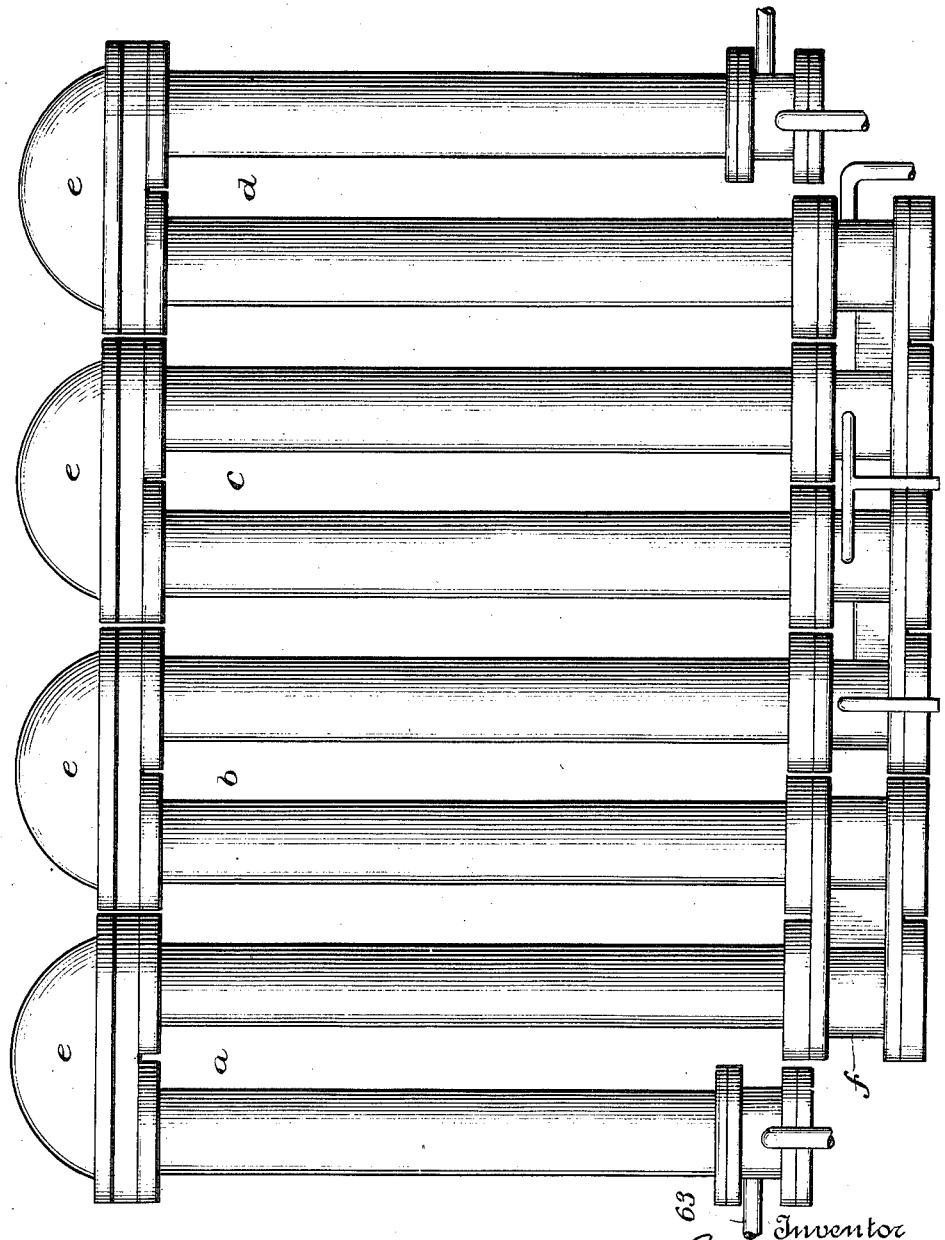
Figure 8:
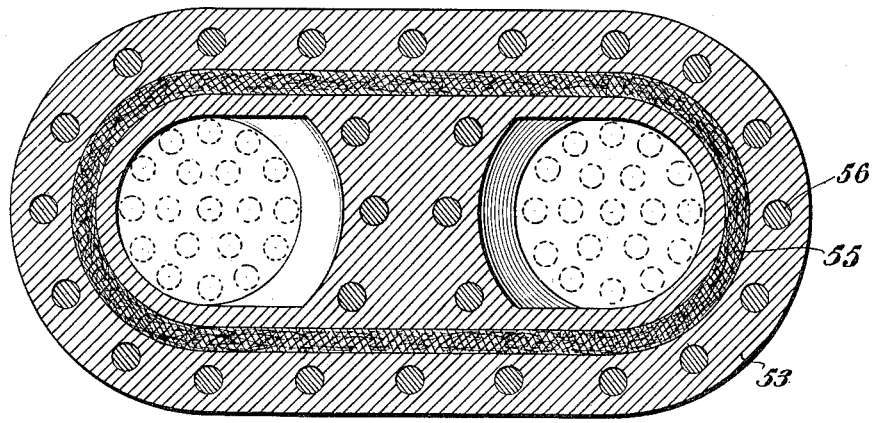
Figure 9:
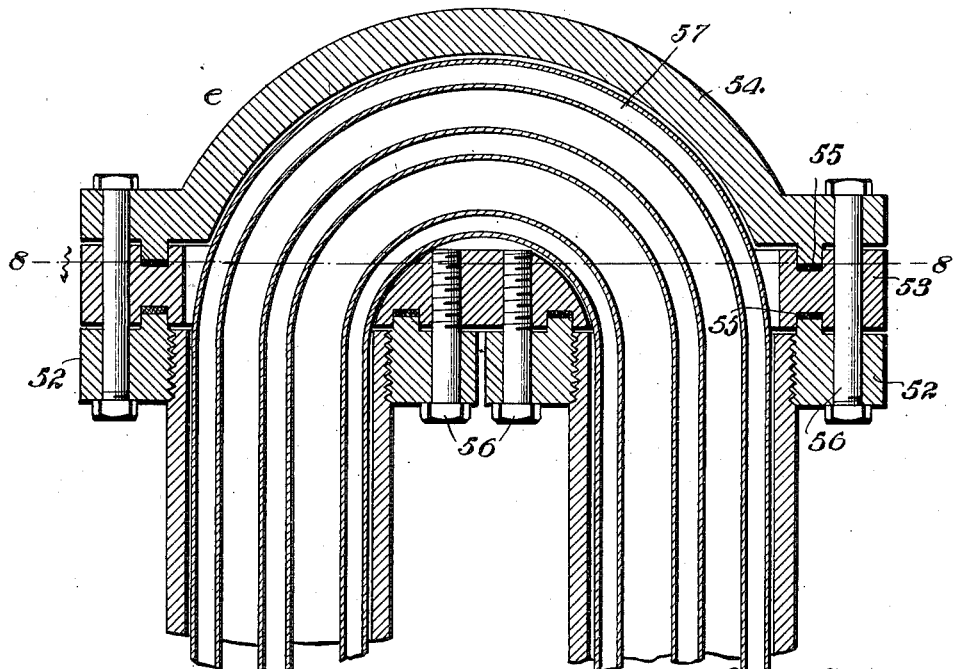
Figure 10:
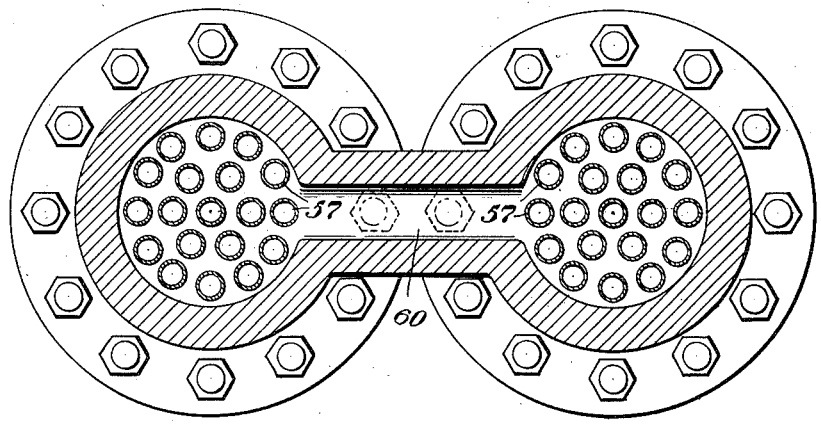
Figure 11:
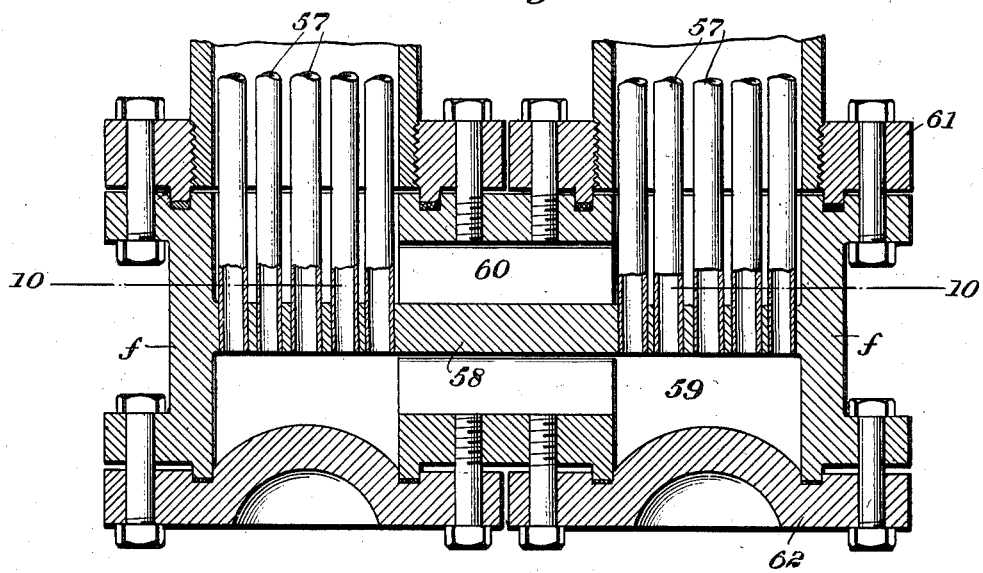

Figure 1 is a side elevation partly in section of a motor adapted for use in my power producing system; Fig. 2 is a front elevation of the same; Fig. 3 is a sectional view of the valves at the power end of the motor cylinder; Fig. 4 is a plan view of the power end of the motor cylinder; Fig. 5 is a section on the line 6—6 of Fig. 2 through the pump end of the motor cylinder; Fig. 6 is a diagram illustrating a complete system or apparatus; Fig. 7 is an enlarged view of the heat exchanging and heat imparting coils, shown in detail in Figs. 8 to 11; Fig. 8 is a section approximately on the line 8—8 of Fig. 9 showing an under side view of one of the return bends; Fig. 9 is a vertical sectional view through the upper part of one of the heat exchanging coils; Fig. 10 is a section on the line 10—10 of Fig. 11; Fig. 11 is a vertical section through the lower coupling member of two of the heat exchanging coils; Fig. 12 is a diagrammatic view illustrating a modified and simple form of my power generating system; Fig. 13 is a diagram showing how the different parts of my apparatus combine to form the different modifications of my method of economically converting heat of either high, moderate or low temperatures into mechanical power by force produced by the heat acting on the expanding liquid circulating through my apparatus.

I shall first describe a motor which is adapted for use in connection with the present invention. It is to be understood however that the form of the motor and its details may be varied widely and that the invention is not limited to the particular motor illustrated.

Referring to Figs. 1 to 6 of the drawings, 20 indicates the base of the motor, 21 a suitable frame for supporting the cylinder, 22 the crank shaft, 23 the fly wheel, 24 the crank, 25 a connecting rod, 26 the cross head sliding in guides 27, 28 the piston rod, 29 the piston, and 30 the cylinder. The cylinder is relatively small in diameter and the piston is preferably much longer than is customary in order to prevent transference of heat from the hotter to the cooler end of the cylinder. The lower cylinder head 31 is seated on the frame 21 and connected with the upper cylinder head 32 by bolts 33. As shown, the upper cylinder head 32 is a casting containing a conduit 34 which communicates with the interior of the cylinder and with the inlet and exhaust valve chambers. The inlet valve 35 is preferably a spring pressed puppet valve, as shown, interposed between the inlet pipe 36 and the conduit 34. The outlet valve 37 is also preferably a puppet valve interposed between the conduit 34 and the exhaust pipe 38. The puppet valves 35, 37 are opened at suitable intervals by rods 39 extending through tubes 40 which serve as stuffing boxes. The lower ends of the rods 39 are connected to rockers 41, each pivoted to a bracket at 42 and carrying a cam roll 43 which travels on a suitable cam 44, on the crank shaft. It will be understood that the cams 44 are suitably shaped to open and close the inlet and exhaust valves at proper intervals. The rockers 41 each consists of two arms between which the valve rods 39 and the rollers 43 are located.

With the motor illustrated I have combined a pump for circulating the liquid, the pump being designed to operate on the liquid when cooled to its lowest temperature in the circulating system. As shown, the lower end of the motor cylinder is used as a pump cylinder, the liquid entering through pipe 45 and exhausting through the pipe 46. Suitable check valves 47, 48 are provided in these pipes. The annular surface 49 of the lower end of the piston 29 should bear substantially the same proportion to the area of the upper end of the piston that the bulk of a given amount of the cooled motor liquid bears to the bulk of the same amount of motor fluid when heated to the higher temperature at which it is admitted to the motor end of the cylinder. The function of the pump will be explained hereinafter.

Referring to Figs. 6 to 11, inclusive, $a$, $b$, $c$, $d$, indicate heat exchanging elements, each comprising two legs or columns united by return bends $e$, at their upper ends. The adjacent legs of each pair are connected at their lower ends by headers $f$. One of the bends $e$ is shown in detail in Fig. 9. It comprises rings 52 screwed to the upper ends of the columns, a double ring 53 interlocking with the rings 52, and an elliptical dome-shaped casting 54 interlocking with the double ring 53. As shown, there are tongue and groove joints 55 between these parts, and the parts are connected together by a series of bolts 56. The return bends $e$ are thus readily detachable, and at the same time they can be secured together tightly so as to confine liquid under pressure.

Within each of the columns of the elements $a$, $b$, $c$ and $d$ are a plurality of tubes 57, the ends of which are connected to partitions 58 in the headers $f$. The tubes therefore communicate with the spaces 59 below the partitions 58 (Fig. 11), while the space surrounding the tubes within the columns communicates with a passage 60 in the header above the partition plate 58. The headers are connected to rings 61 screwed on to the columns and are provided with covers 62, the joints being suitably packed and the parts suitably bolted together.

The exhaust pipe 38 leading from the engine enters the upper passage 60 in the element $b$, as shown in Fig. 6, and the exhaust liquid passes through the elements $b$ and $c$ outside of the tubes 57, as indicated by the full line arrows, during which movement it imparts part of its heat to the liquid which is traveling toward the engine, as will be hereinafter explained. The exhaust liquid leaves the heat exchanging element $a$ through a pipe 63, and passes through a series of coils 64 in a cooling tank 65, which may be filled with brine or other fluid having a low freezing point. From the tank 65 the exhaust liquid passes to the pipe 45 leading to the pump end of the engine cylinder 30. The liquid is forced by the pump through the return pipe 46 to the first leg of the heat exchanging element $a$ from which it passes through the tube 57 successively through the heat exchanging elements $a$, $b$, $c$ and $d$, and into the engine supply pipe 36, which communicates with one leg of the element $d$.

The space surrounding the tube 57 in the element $c$ does not communicate with the like spaces in the elements $b$ and $d$, the headers being modified to prevent communication, as shown in Figs. 6 and 7. In the space surrounding the tubes 57 of the element $c$ I preferably circulate ammonia, which is used to cool the brine in the tank 65. The ammonia gas is compressed by a pump 66 driven by the engine, being delivered from the pump to a pipe 67 and conducted into the bend $e$ of the heat exchanging element $c$. As is well known, the compressed ammonia gas is very hot and in passing through this element it imparts both its sensible and latent heat to the motive liquid passing through the tubes 57 and is itself condensed or liquefied. The liquefied ammonia is conducted through a pipe 68 to a series of coils 69 in the brine tank, and the vaporization of the liquid ammonia causes it to cool in a well known manner, and in passing through the brine it takes up heat from the brine which in turn takes up heat from the motive liquid passing through the coils 64. From the coils 69 the vaporized ammonia returns to the pump 66 through pipe 71. It is desirable to impart still further heat to the motive liquid, and to this end I preferably admit steam to the space surrounding the tubes of the heat exchanging element $d$. I have shown in Fig. 6 a boiler B for generating steam, the live steam passing from the dome of the boiler through a pipe 72 to the upper end of the element $d$, and the condensed water and returning steam returning to the boiler through a pipe 73. It will be understood that instead of using live steam I may use exhaust steam or any other source of heat available for raising the motive liquid to the final temperature stage necessary.

I have shown air chambers 74 at various points in the piping systems which serve as cushions to prevent damage to the piping from excessive internal pressure and shock, and I have also shown a relief valve 75 on the liquid supply pipe with a communicating bypass 76 leading to the exhaust pipe to permit any excess of liquid to escape from the supply pipe without passing through the engine. I have also provided on the exhaust pipe a relief valve 78 with a discharge pipe 79 which may communicate with a suitable receptacle into which any excess liquid will be discharged. The relief valves are shown in detail in Fig. 12.

In Fig. 12 I have shown a very simple form of the heat exchanging apparatus in which A indicates a cooling coil, B a heat exchanging coil in which the heat of the exhaust liquid is imparted to the returning liquid, and D a coil in which the heat of exhaust or live steam, or heat from some other source, is used to bring the motive liquid up to the required temperature. The coil B is of double piping, the exhaust liquid from the engine passing from the pipe 38 between the two tubes of the coil B while the returning liquid from the pump passes through the inner tube 47. The tube 46 is provided with a drain valve 80. Cooled water at natural temperature should be continuously circulated through the tank 81, being preferably admitted through pipe 82 at the bottom of the tank and permitted to overflow through pipe 83 near the top of the tank. From the lower end of the coil A the liquid passes through pipe 45 to the pump end of the motor cylinder 30. The returning liquid passes from the coil B to the inner tube or coil D where it is surrounded by steam or other hot fluid entering by the pipe 84 and discharging through the pipe 85. From the coil B the return liquid passes through the tube 36 to the engine as heretofore described.

Fig. 13 shows a form of this invention which is adapted to be used under various conditions. No attempt has been made to draw the machine of this case to scale, but certain parts have been made larger for the purpose of more clearly showing the entire machine in one figure. The parts which correspond to similar parts in the other figures have been designated by the same reference characters with an exponent added.

Referring to Fig. 13, the motor consists of a piston composed of a power section $30^a$ and a pump section $30^b$. This piston works in connected power and pump cylinders, and is operatively connected to a crank $42^a$ on the crank shaft by means of a connecting rod $25^a$. The power cylinder is provided with a port governed by an oscillating valve $35^a$ operated by an eccentric $47^a$ on the crank shaft. This valve controls the supply of fluid from the supply pipe $36^a$ and to a discharge pipe $38^a$. The pump is provided with an outlet valve $47^a$ and an inlet valve $48^a$ which control the supply and discharge of the fluid from the pump. The heat exchanger $B_1$ comprises a pipe divided by a partition to form a supply conduit $B_2$ and a return conduit $B_3$. The pump end $A_1$ of the return conduit is surrounded by a suitable jacket $A_2$ which is arranged to be supplied with cooling fluid, the inlet pipe being shown at $82^a$ and the outlet by $83^a$. A jacket $D_1$ surrounds the supply pipe or conduit and is arranged to receive a heating fluid from a steam boiler $B_4$ through the pipe $72^a$, the return pipe being shown at $73^a$. Auxiliary fluid inlet and outlet connections are shown at $86^a$ and $87^a$.

A refrigerating machine $66^a$ is connected by pipe connections to the cooling jacket $A_2$ and to a heating jacket $C_1$ surrounding the supply pipe. The pipe connections are shown at $71^a$, $67^a$ and $68^a$, and the direction of the refrigerating fluid is shown by the arrows. A second refrigerating machine $66^b$ is connected to the heating jacket $D_1$ by means of pipes $67^b$ and $68^b$. The return pipe $68^b$ is connected to a coil $69^b$ in a tank $65^b$, and the discharge end of this coil is connected to a pipe 71$^b$ which leads to the inlet of the refrigerating machine. The pipe connections are provided with valves so that any one of the elements may be cut out of service, and suitable safety valves 75$^a$ and 78$^a$ and air chambers 74$^a$ are provided for the purpose hereinbefore described.

Let us suppose that the refrigerating machines 66$^a$ and 66$^b$ have been cut out of operation by the valves, and that the valves in the branch pipes 86$^a$ and 87$^a$ have also been closed, and that heat is supplied to the jacket D$_1$ by the boiler B$_4$, and that cooling fluid like water is supplied to the cooling jacket A$_2$ from the pipe 83$^a$. The operation of the machine will then be similar to that shown in Figs. 6 and 12, the member B$_1$ performing the function of the heat exchanger. The operation need not therefore be described in detail. If an outside cooling fluid is not accessible then the refrigerating machine 66$^a$ which is driven by the engine can be used for this purpose. The refrigerating fluid will be compressed by the machine 66$^a$ and pass through the pipes in the direction of the arrows and will give up its latent heat to the jacket C$_1$, so that it will be liquefied and the expansion of the liquefied fluid in the jacket A$_2$ will cool the exhaust so as to furnish the necessary difference in temperatures. It will be understood of course that the boiler B$_4$ is used to furnish the extra supply of heat.

If a supply of warm water is accessible, then this warm water may be supplied to the heating jacket D$_1$ through the pipe 86$^a$ and the exhaust may be cooled in any suitable manner hereinbefore described. This supply of water may be from any suitable source; for instance, it may, in certain cases, be river or ocean water where the engine is used to propel ships, especially in tropical countries where the water is warm. In such a case the heated jacket D$_1$ can be supplied with the river or ocean water, and the exhaust can be cooled by means of the refrigerating machine 66$^a$.

In case there is merely a supply of water of low temperature, as in cold climates, then the heat of the water can be utilized to furnish the heat to the heating jacket D$_1$. Thus the tank 65$^b$ can be supplied with water of low temperatures and the liquefied refrigerating fluid vaporized in the coils 69$^b$ so that the water will give up its latent heat to the refrigerating fluid. This refrigerating fluid is then conducted to the refrigerating machine to be compressed and heated, and then discharged to the jacket D$_1$ so as to give up its latent heat to the heating jacket D$_1$ and be liquefied, the liquefied refrigerating fluid being conducted back to the coils 69$^b$ to be again vaporized. In this way the latent heat in the water can be utilized for heating the pipe D$_2$. The tank 65$^b$ may contain brine and this may be a refrigerating tank which may be used for freezing ice on shipboard. It will be understood that with this method as well as in the method described in the preceding paragraph, the supply of heat from the boiler B$_4$ and the supply of cooling fluid to the jacket A$_2$ may be cut out.

The operation of my invention will be clear from the foregoing description.

While I may use a pump which is driven from the motor by gearing or other suitable connections for circulating the liquid, I find it particularly desirable to use a combined motor and pump such as illustrated in the drawings, for the reason that the pressure per unit of area in both ends of the cylinder is substantially the same and there will be practically no leakage past the piston in either direction. Furthermore, by the use of the combined pump and motor operating in the same cylinder, the exhaust from the pump will be accurately timed with the inflow of liquid to the motor, which is very desirable in this type of apparatus. The piston rod is at the cooler end of the engine which is advantageous.

It will be understood that my invention may be embodied in widely different forms of apparatus without departing from the scope and spirit thereof, the two general views in Figs. 6 and 12 being examples of different forms which the apparatus may take. It will also be understood that the apparatus illustrated is more or less diagrammatic, the drawings being in no sense working drawings. The liquid pressures in a working apparatus will be extremely high and the various parts of the conduits and fittings and of the motor and pump will be made of such strength as may be necessary, and the joints and packings made to securely contain the liquid. In starting the apparatus the system is to be filled with fluid under pressure which may be done by a suitable pump, and similar means will be employed to replace any liquid lost through leakage.

The principle upon which my power producing apparatus works enables me to obtain power from many natural and artificial sources of heat which are not available for power producing purposes at the present time. It is simply essential that a considerable difference of temperature be maintained between the hot or motor end of the system and the cool or pump end thereof. This may be attained in a cool climate by means of the cool surface water and hot water derived from natural springs which occur in many localities, or in a hot climate I may avail myself of the difference in temperature of water or other liquid heated by the sun and cooler water from springs or wells. In refrigerating plants using ammonia, for instance, much heat is wasted in cooling the compressed ammonia. It will be obvious that instead of applying the cooling water direct to the ammonia pipes I may transfer the heat of the ammonia to the liquid in my power generating system and utilize the same for producing a portion or all of the power necessary to compress the ammonia or for other purposes. In short, I have invented a power generating system adapted to operate with lower temperatures than steam boilers, for instance, and in which I can utilize natural or artificial heat which is now generally wasted.

When using a liquid like carbon dioxid in which the latent heat of vaporization decreases as the temperature increases, it is sometimes desirable to run the temperature at the hot end of the motor to the critical point, that is, where the liquid is converted into a gas, the temperature and pressure being elevated so that the latent heat is exceedingly small, whereby no energy will be lost in the form of latent heat in the conversion of the working fluid from a liquid to a gas. Where the temperature of the liquid is beyond the critical point then it will be slightly elastic, but this is a distinct advantage in view of the fact that the motor can be operated expansively, the supply of fluid to the motor being cut off before the end of the stroke so as to secure expansion of the working fluid. It is also advantageous to run the temperature up near the critical point since at this point the ratio of expansion will be greater than at other points.

Having thus described the invention, what is claimed is:

1. In a power generating apparatus, the combination of a system of conduits for circulating liquid under high pressure, a liquid pressure motor in said system, and means for causing the exhaust liquid from said motor to impart heat to the liquid returning to the motor.

2. In a power generating apparatus, the combination of a system of conduits for circulating liquid under high pressure, a liquid pressure motor in said system, a pump for positively circulating the liquid in said conduits, and means for causing the exhaust liquid from the motor to impart heat to the liquid returning to the motor.

3. In a power generating apparatus, the combination of a system of conduits for circulating liquid under high pressure, a liquid pressure motor in said system, means for cooling the exhaust liquid from the motor, means for pumping the cooled liquid back toward the motor, and means for heating the liquid returning from the pump to the motor.

4. In a power generating apparatus, the combination of a system of conduits for circulating liquid under high pressure, a liquid pressure motor in said system, a heat exchanging device whereby the exhaust liquid from the motor imparts a portion of its heat to the liquid returning to the motor, means for further cooling the exhaust liquid, and a pump operating upon the cooled liquid to circulate the same.

5. In a power generating apparatus, the combination of a system of conduits for circulating liquid under high pressure, a liquid pressure motor in said system, a pump in said system for circulating the liquid, means for cooling the liquid, and means for reheating the liquid, the pump being arranged to operate upon the cooler liquid and the engine being arranged to be operated by the hotter liquid.

6. In a power generating apparatus, the combination of a system of conduits for circulating liquid under high pressure, a liquid pressure motor in said system and through which the liquid passes, a heat exchanging device whereby the exhaust liquid from the motor imparts heat to the liquid returning to the motor, a cooling apparatus including a compression pump and a cooling tank, means for utilizing the heated liquid from the compression pump to impart further heat to the liquid returning to the motor, means for causing the cooling tank to decrease the temperature of the exhaust liquid from the motor, and a pump for forcing the liquid through said system of conduits, the pump operating at the coolest portion of said system, and the motor being arranged to be operated by the liquid at the hottest portion of the system.

7. In a power generating apparatus, the combination of a combined liquid pressure motor and pump comprising a cylinder, a piston therein having different effective areas on its ends, a system of conduits for circulating liquid under high pressure, both ends of said piston being in communication with the liquid in said system, the smaller end of the piston serving as a pump piston to circulate said liquid and the larger end of said cylinder receiving pressure from said system to operate the motor, means for cooling the liquid in said system as it travels from the motor end of the piston to the pump end thereof, and means for heating said liquid as it travels from the pump end of the piston back to the motor end thereof.

8. In a power generating apparatus, the combination of a system of conduits for circulating liquid under high pressure, a liquid pressure motor in said system, a pump in said system, means for cooling the exhaust liquid between the motor and the pump, means for reheating the liquid as it travels from the pump to the motor, a by-pass connecting the supply and exhaust conduits of the motor, and a relief valve controlling said by-pass.

9. In a power generating apparatus, the combination of a system of conduits for circulating liquid under high pressure, a liquid pressure motor in said system, a pump in said system, means for cooling the exhaust liquid between the motor and the pump, and means for reheating the liquid as it travels from the pump to the motor, the pump being driven by the motor and the displacement of the pump being proportioned to the displacement of the motor as the volume of a given amount of the cooler liquid entering the pump is to the volume of the same amount of the hotter liquid entering the motor.

10. In a power generating apparatus, the combination of a system of conduits for circulating liquid under high pressure, a liquid pressure motor in said system, a pump in said system, means for cooling the exhaust liquid between the motor and the pump, and means for reheating the liquid as it travels from the pump to the motor, the pump being driven by the motor and the displacement of the pump being proportioned to the displacement of the motor as the volume of a given amount of cooler liquid entering the pump is to the volume of the same amount of the hotter liquid entering the motor, the motor and pump having a common cylinder and piston.

11. In a power generating apparatus, the combination of a system of conduits for circulating liquid under high pressure, a liquid pressure motor in said system, and means for transferring heat from the exhaust liquid of the motor to the supply liquid comprising a pair of parallel tubes, a semicircular bend connecting said tubes at one end, headers at the opposite end, partitions in said headers, and continuous U-shaped pipe sections within said tubes and having their ends secured to said partitions.

12. In a power generating apparatus, a system of conduits for circulating liquid under high pressure, comprising a heat exchanging element, said element consisting in a series of pairs of parallel tubes, semicircular bends connecting the tubes of each pair at one end thereof, headers connecting the tubes of adjacent pairs at opposite ends thereof, partitions in said headers, and continuous U-shaped pipes within said tubes having their ends secured in said partitions.

13. In a power generating apparatus, the combination with a motor and a pump, of high and low pressure liquid conduits connecting said motor and pump, and means whereby heat may be applied to said high pressure conduit.

14. In a power generating apparatus, the combination with a motor and a pump, of high and low pressure liquid conduits connecting said motor and pump, and means whereby the liquid in said high pressure conduit may be heated in its travel to the engine.

15. In a power generating apparatus, the combination with a motor and a pump, of high and low pressure liquid conduits connecting said motor and pump, and means whereby the liquid may be heated in its travel from the pump to the engine and cooled in its travel from the engine to the pump.

16. In a power generating apparatus, the combination with a motor and a pump, of high and low pressure liquid conduits connecting said motor and pump and constructed so that heat is imparted from the low pressure to the high pressure conduit, and means whereby heat may be applied to said high pressure conduit.

17. A method of generating power, which consists in heating an expansible liquid under high pressure to expand the same, utilizing the expanded liquid in a motor, and cooling the exhaust.

18. A method of generating power, which consists in heating an expansible liquid under high pressure to expand the same, utilizing the expanded liquid in a motor, cooling the exhausted liquid, returning the exhausted liquid to the motor, and again heating it prior to its introduction in the motor.

19. A method of generating power, which consists in heating an expansible liquid under high pressure to expand the same, utilizing the expanded liquid in a motor, cooling the exhaust, and pumping the exhausted liquid back to the motor in a continuous circuit.

20. A method of generating power, which consists in heating an expansible liquid under high pressure to expand the same, utilizing the expanded liquid in a motor, cooling the exhaust, pumping the exhausted liquid back to the motor in a continuous circuit, and causing the exhausted liquid to impart its heat to the liquid which is pumped back to the engine.

In testimony whereof I affix my signature in presence of two witnesses.

JOHN PATTEN.

Witnesses:
ARTHUR L. BRYANT,
J. H. BRUNINGA.